United States Patent
Wurtenberger et al.

(10) Patent No.: US 8,140,101 B1
(45) Date of Patent: Mar. 20, 2012

(54) DYNAMIC ADJUSTMENT OF FORWARD-LINK TRAFFIC-CHANNEL POWER LEVELS BASED ON FORWARD-LINK RF CONDITIONS

(75) Inventors: Andrew M. Wurtenberger, Olathe, KS (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1007 days.

(21) Appl. No.: 11/688,135

(22) Filed: Mar. 19, 2007

(51) Int. Cl.
*H04Q 7/20* (2006.01)

(52) U.S. Cl. .................. 455/522; 455/13.4; 370/318
(58) Field of Classification Search .................... 455/522
See application file for complete search history.

(56) References Cited

U.S. PATENT DOCUMENTS

| | | | |
|---|---|---|---|
| 6,594,501 B2 * | 7/2003 | Black et al. | 455/522 |
| 6,628,958 B1 * | 9/2003 | Kamel et al. | 455/522 |
| 6,678,257 B1 | 1/2004 | Vijayan et al. | |
| 6,760,598 B1 * | 7/2004 | Kurjenniemi | 455/522 |
| 6,785,247 B1 | 8/2004 | Lee | |
| 6,963,750 B1 | 11/2005 | Cheng et al. | |
| 7,190,688 B1 * | 3/2007 | Kamel et al. | 370/342 |
| 7,395,058 B1 | 7/2008 | Kalofonos et al. | |
| 7,437,176 B1 | 10/2008 | Ribas et al. | |
| 7,466,682 B1 | 12/2008 | Ribas et al. | |
| 7,746,816 B2 | 6/2010 | Attar | |
| 7,787,899 B1 | 8/2010 | Talley et al. | |
| 7,813,323 B1 | 10/2010 | Talley et al. | |
| 2001/0019943 A1 * | 9/2001 | Bender et al. | 455/13.4 |
| 2002/0022484 A1 * | 2/2002 | Dickey | 455/446 |
| 2002/0105923 A1 | 8/2002 | Nikides | |
| 2003/0050084 A1 * | 3/2003 | Damnjanovic et al. | 455/522 |
| 2003/0087641 A1 | 5/2003 | Gustafsson | |
| 2003/0125069 A1 * | 7/2003 | Lee | 455/522 |
| 2003/0134655 A1 | 7/2003 | Chen et al. | |
| 2003/0231586 A1 | 12/2003 | Chheda | |
| 2004/0116133 A1 * | 6/2004 | Kalhan et al. | 455/456.2 |
| 2004/0203809 A1 | 10/2004 | Au et al. | |
| 2006/0189334 A1 | 8/2006 | Wakabayashi | |
| 2006/0209721 A1 | 9/2006 | Mese et al. | |
| 2006/0247923 A1 | 11/2006 | Chandran et al. | |
| 2006/0276195 A1 | 12/2006 | Nordling | |
| 2007/0019589 A1 | 1/2007 | Attar | |
| 2007/0042799 A1 * | 2/2007 | Jubin et al. | 455/522 |
| 2007/0149235 A1 * | 6/2007 | Chin et al. | 455/522 |
| 2008/0161033 A1 | 7/2008 | Borran | |
| 2008/0201225 A1 | 8/2008 | Maharajh et al. | |

(Continued)

OTHER PUBLICATIONS

Notice of Allowance from U.S. Appl. No. 11/681,867, mailed Apr. 15, 2010.

(Continued)

*Primary Examiner* — Dwayne Bost
*Assistant Examiner* — Joseph Dean, Jr.

(57) ABSTRACT

Methods and systems are provided for dynamic adjustment of forward-link traffic-channel power levels based on forward-link RF conditions. In an exemplary embodiment, a base station provides service on a carrier in a wireless coverage area. The base station computes an $E_c/I_{or}$ value for the carrier. Based at least in part on the computed $E_c/I_{or}$ value, the base station adjusts at least one of an initial traffic-channel power level, a minimum traffic-channel power level, and a maximum traffic-channel power level for the carrier. As an example, if $E_c/I_{or}$ is above a certain threshold, the base station may increase all three of the power levels, so as to improve service quality and coverage of its traffic channels, among other advantages.

15 Claims, 4 Drawing Sheets

U.S. PATENT DOCUMENTS

2008/0207182 A1     8/2008    Maharajh et al.
2009/0024387 A1     1/2009    Chandran et al.

OTHER PUBLICATIONS

Non-Final Office Action from U.S. Appl. No. 12/836,399, mailed Nov. 22, 2010.
Unpublished U.S. Appl. No. 11/681,867, filed Mar. 5, 2007.
Non-Final Office Action from U.S. Appl. No. 11/681,867, mailed Oct. 28, 2009.
Non-Final Office Action from U.S. Appl. No. 11/080,768, mailed Jan. 30, 2008.
Unpublished U.S. Appl. No. 11/681,867, entitled "Dynamic Adjustment of Pilot-Channel, Paging-Channel, and Sync-Channel Transmission-Power Levels Based on Forward-Link and Reverse-Link RF Conditions," filed Mar. 5, 2007 in the name of inventor Ryan Talley et al.
Non-Final Office Action from U.S. Appl. No. 12/836,399, mailed Jun. 8, 2011.

* cited by examiner

DYNAMIC ADJUSTMENT OF FORWARD-LINK TRAFFIC-CHANNEL POWER LEVELS BASED ON FORWARD-LINK RF CONDITIONS

BACKGROUND

1. Technical Field

The present invention relates to wireless communications, and, more particularly, to managing base-station transmission power in wireless networks.

2. Description of Related Art a. CDMA Networks Generally

Many people use mobile stations, such as cell phones and personal digital assistants (PDAs), to communicate with cellular wireless networks. These mobile stations and networks typically communicate with each other over a radio-frequency (RF) air interface according to a wireless communication protocol such as Code Division Multiple Access (CDMA), perhaps in conformance with one or more industry specifications such as IS-95 and IS-2000. Wireless networks that operate according to these specifications are also referred to as "1xRTT (1x) networks," which stands for "Single Carrier Radio Transmission Technology". These networks (referred to herein as "CDMA networks") typically provide communication services such as voice, Short Message Service (SMS) messaging, and packet-data communication.

Typical CDMA networks include a plurality of base stations, each of which provide one or more wireless coverage areas, such as cells and sectors. As a general matter, sectors are used herein as examples of wireless coverage areas. When a mobile station is positioned in a sector, it can communicate over the RF air interface with the base station, and in turn over one or more circuit-switched and/or packet-switched signaling and/or transport networks to which the base station provides access. The base station and the mobile station conduct these communications over a frequency known as a carrier. Note that base stations may provide service in a sector on one carrier, or on more than one, and further that a given instance of a given carrier in a given sector may be referred to herein as a "sector/carrier."

Communication, including voice and packet-data communication, between the mobile station and the base station is separated into forward-link communication (from the base station to the mobile station) and reverse-link communication (from the mobile station to the base station). And each carrier over which this communication takes place is typically actually a pair of distinct frequencies—one for the forward link and the other for the reverse link. This approach is known as frequency division duplex (FDD).

In a typical CDMA network, using a configuration known as radio configuration 3 (RC3), a base station can, on each sector/carrier, transmit forward-link data on a maximum of 64 distinct channels at any given time. Each of these 64 channels corresponds to a unique 64-bit code known as a Walsh code. Of these, typically, 61 channels are available for use as traffic channels (to carry user data), while the other 3 are reserved for administrative channels known as the pilot channel, the paging channel, and the sync channel.

In general, the pilot channel functions to alert mobile stations in a given sector of the presence of a service-providing base station. Typically, the pilot channel conveys a value known as a pseudorandom number (PN) offset, which identifies the sector; in particular, by being offset from CDMA system time by a certain amount of time, the pilot channel conveys the PN offset. Mobile stations generally use the pilot channel to coherently detect and demodulate the signal on a sector/carrier. The paging channel is typically used to transmit overhead messaging, such as incoming-call and message-waiting pages, as well as SMS messages, to mobile stations. The paging channel typically also broadcasts values known as the system identification code (SID) and the network identification code (NID), which, taken together, help identify a given sector. The sync channel generally provides information that enables the base station and mobile stations to be precisely synchronized on CDMA system time.

When a base station instructs a mobile station to use a particular traffic channel for a particular communication session, the base station does so by instructing the mobile station to tune to a particular one of those 64-bit Walsh-coded traffic channels. It is over that assigned traffic channel that the base station will transmit forward-link data to the mobile station during the ensuing communication session. Note that, in addition to including the forward-link channel, the traffic channel also includes a corresponding Walsh-coded reverse-link channel, over which the mobile station transmits data to the base station. These traffic channels may be used for different types of communication, among which are second-generation (2G) voice, 2G data, third-generation (3G) voice, and 3G data.

b. Forward-Link Transmission-Power Management i. The Power Control Bit and the Ratio $E_b/N_t$ In CDMA networks, the transmitting power of a base station on a given sector/carrier is divided among the mobile stations to which the base station is transmitting voice data and/or packet data on traffic channels, as well as among the pilot, paging, and sync channels mentioned above. With respect to mobile stations that engage in 3G voice and 3G data communications, the amount of power that the base station is allocating to the transmission to any one mobile station on that mobile station's respective traffic channel at any given moment is based on a number of factors, two of which are known as the power control bit (PCB) and the ratio $E_b/N_t$.

The PCB is a bit (0 or 1) that the mobile station sends to the base station on the reverse link at a high frequency, on the order of 800 times per second (i.e. once every 1.25 milliseconds (ms)). The base station repeatedly responsively adjusts the transmission power to the mobile station on the traffic channel. Typically, if the mobile station sends a 0, the base station will decrease the power by a set decrement, such as 1 dB, whereas, if the mobile station sends a 1, the base station will increase the power by a set increment, which may also be 1 dB. Thus, the forward-link transmission power changes every 1.25 ms by plus or minus 1 dB.

A typical CDMA mobile station determines whether to transmit a PCB equal to 0 or 1 by comparing (i) a signal-to-noise ratio that the mobile station repeatedly computes with (ii) a stored threshold value for that signal-to-noise ratio. This ratio is generally known and referred to herein as "$E_b/N_t$," while the threshold is referred to herein as the "$E_b/N_t$ threshold." $E_b/N_t$ essentially compares the strength at which the mobile station is receiving the traffic-channel signal ($E_b$ for "energy per bit") with the strength at which the mobile station is receiving signals from all sources on the frequency of the sector/carrier ($N_t$ for "noise") As stated, then, $E_b/N_t$ is a signal-to-noise ratio for the traffic channel. And the mobile station typically computes $E_b/N_t$ at the same frequency at which it transmits the PCB, which again may be once every 1.25 ms.

Thus, in typical operation, every 1.25 ms, the mobile station compares the most recent computation of $E_b/N_t$ with the $E_b/N_t$ threshold. If $E_b/N_t$ exceeds the threshold, then the mobile station is receiving a strong enough signal on the traffic channel, and thus it transmits a PCB of 0, which causes the base station to reduce the forward-link power on that traffic channel. If, on the other hand, the computed $E_b/N_t$ is less than the threshold, the mobile station is not receiving a strong enough signal, and thus it transmits a PCB of 1, which causes the base station to increase the forward-link power. Thus, the forward-link power on the traffic channel typically stabilizes to a point that achieves an $E_b/N_t$ value (as measured at the mobile station) that is near the $E_b/N_t$ threshold. And this threshold can be changed during operation.

ii. Forward-Link Frame Error Rate (FFER)

In CDMA networks, data is transmitted from the base station to the mobile station (and vice versa) in data units that are known as frames, which typically last 20 ms. Some frames received by mobile stations contain errors as a result of imperfect transfer from the base station, while some do not. The forward-link frame error rate (FFER) is a ratio, also computed by the mobile station, of the number of error-containing frames that the mobile station receives to the total number of frames that the mobile station receives, over a given time period. Note that the FFER often also takes into account frames that are not received at all by the mobile station. And, other things being more or less equal, the more power that the base station allocates to a given mobile station, the lower the mobile station's FFER will be.

More particularly, at approximately the same frequency at which the mobile station is receiving forward-link frames (i.e. once every 20 ms), the mobile station computes its FFER over some previous number of frames, which may be 20, 100, 200, or some other number. Thus, the mobile station essentially computes a FFER for some rolling window of previous frames. And each time the mobile station computes its FFER, the mobile station compares that computed value with a threshold, often referred to as the "FFER target," which may be around 2%.

If the FFER exceeds the FFER target, the mobile station is experiencing too many error-containing and/or missed frames, and thus the mobile station will responsively increase its $E_b/N_t$ threshold. In the short term, this will result in the mobile station's computed $E_b/N_t$ falling below that increased threshold, which in turn will result in the mobile station repeatedly sending PCBs equal to 1 to the base station. This, in turn, will result in the base station increasing the forward-link transmission power to the mobile station on the traffic channel. The forward-link power will then typically stabilize at a level that will result in the mobile station computing an $E_b/N_t$ that is very close to its new $E_b/N_t$ threshold, and perhaps result in an acceptable FFER.

If, on the other hand, the FFER falls below the FFER target, the mobile station may be drawing excessive power from the base station on the forward-link—in essence, the mobile station's signal may be considered too strong, perhaps at the expense of other mobile stations on the sector/carrier. If that situation holds for a specified period of time, the mobile station may decrease its $E_b/N_t$ threshold, which will result in the mobile station's computed $E_b/N_t$ repeatedly exceeding that decreased threshold. This, in turn, will result in the mobile station repeatedly sending PCBs equal to 0 to the base station, which will result in the base station decreasing the forward-link transmission power to the mobile station on the traffic channel. Again, the forward-link power will then typically stabilize at a level that will result in the mobile station computing and $E_b/N_t$ that is very close to its new $E_b/N_t$ threshold.

Thus, the combination of (i) the mobile station's FFER target and (ii) the mobile station's repeated FFER calculation and comparison with the FFER target causes the mobile station to iteratively adjust its $E_b/N_t$ threshold. In turn, the mobile station's even-more-frequent calculation of $E_b/N_t$ and comparison with its current $E_b/N_t$ threshold causes the mobile station to iteratively send power control bits of 0 (for less power) or 1 (for more power) to the base station, which then causes the base station to adjust the forward-link power on the traffic channel. This entire back-and-forth calibration process is conducted in an attempt to keep the mobile station's FFER at or below what is deemed to be an acceptable threshold, which again may be around 2%.

Note that different situations may present themselves on a given sector/carrier at different times. For one, the number of mobile stations using traffic channels can vary between just a few, such as 10, to a larger number, such as 30, and perhaps approach the upper bound of 61 (assuming RC3). And, as stated, the power that the base station allocates for transmission to these mobile stations can vary. In particular, variables such as terrain, weather, buildings, other mobile stations, other interference, and distance from the base station can affect the FFER that each mobile station experiences, and thus the amount of power the base station allocates for each mobile station. Since base stations have a finite amount of power that they can allocate to the mobile stations on a given sector/carrier, increasing the transmission power to some or all of those mobile stations generally results in the base station being able to serve fewer mobile stations on that sector/carrier. That is, it reduces capacity on the sector/carrier.

iii. The Logarithmic Ratio $E_c/I_{or}$

As explained, in CDMA networks, a given base station has a finite amount of power for transmitting on each sector/carrier on which it provides service. The base station divides this power among any active traffic channels (over which it is transmitting voice and/or packet data to mobile stations), as well as among the pilot, paging, and sync channels. Periodically, for a given sector/carrier, the base station calculates a ratio of (a) the power it is allocating for transmitting the pilot channel (the "pilot-channel power level") with (b) the power it is allocating for transmitting all (i.e. pilot, paging, sync, and traffic) channels (the "all-channel power level").

This ratio is a base-10 logarithmic one, and is known as "$E_c/I_{or}$." The pilot-channel power level is referred to as "$E_c$"—"energy per chip." The all-channel power level is referred to as "$I_{or}$". $E_c$ and $I_{or}$ can each be expressed in Watts (W), milliwatts (mW), or any other suitable units of measure. Note that $E_c$ and $I_{or}$ are often expressed as base-10 logarithmic ratios themselves, with respect to a reference power level of 1 mW. In that case, $E_c$ and $I_{or}$ would each typically be expressed using the unit "dBm," where "dB" indicates decibels and "m" indicates the reference power level. So, $E_c$ can be expressed as the base-10 logarithmic ratio of the pilot-channel power level (in mW) and 1 mW. And $I_{or}$ can be expressed as the base-10 logarithmic ratio of the all-channel power level (in mW) and 1 mW.

$E_c/I_{or}$ is typically expressed as the base-10 logarithmic ratio of the pilot-channel power level and the all-channel power level, each of which may be measured in Watts. As such, the typical unit of measure for $E_c/I_{or}$ is the decibel (dB). As an example, if a base station were allocating about 2 W (2000 mW) for the pilot channel, $E_c$ would be about 33 dBm, calculated as $10*\log((2000\ mW)/(1\ mW))$. And if the base station were allocating a total of about 10 W (10,000 mW) for the pilot, paging, sync, and active traffic channels, $I_{or}$ would be about 40 dBm, calculated as $10*\log((10000\ mW)/(1\ mW))$. In this example, $E_c/I_{or}$ would be about −7 dB, calculated as $10*\log((2\ W)/(10\ W))$. Note that $E_c/I_{or}$ will always be negative, as long as at least some power is allocated for any one or any combination of the paging, sync, and traffic channels.

As another example, a typical base station may have 16 W of power that it can potentially use for transmitting all channels on a sector/carrier, and may allocate 15% (2.4 W) of that for the pilot channel, 10% (1.6 W) for the paging channel, and 5% (0.8 W) for the sync channel. When that base station is not serving any mobile stations on active traffic channels on the sector/carrier, i.e. when the sector/carrier is "unloaded," $E_c/I_{or}$ would be approximately −3 dB, calculated as 10*log ((2.4 W)/(4.8 W)), which, then, would be about as high as $E_c/I_{or}$ gets. Thus, for reference, anything close to −3 dB may be considered relatively high for $E_c/I_{or}$.

And when that same base station is at or near capacity ("fully loaded"), the 15% of its potential sector/carrier power that it is allocating for the pilot channel would shrink from being half of its power output on the sector/carrier (in the unloaded scenario) to, not surprisingly, being about 15% of its power output. This would yield an $E_c/I_{or}$ of approximately −8 dB, calculated as 10*log((2.4 W)/(16 W)), which, then would be about as low as $E_c/I_{or}$ gets. Thus, for reference, anything close to −8 dB may be considered relatively low for $E_c/I_{or}$. In fact, a typical base station may stop accepting new mobile stations on a sector/carrier once $E_c/I_{or}$ degrades to about −8 dB. Thus, $E_c/I_{or}$ can impact sector/carrier capacity as well.

When $E_c/I_{or}$ is relatively high, this could mean a number of things. For example, there could be only a few mobile stations on the sector/carrier (i.e. the sector/carrier is lightly loaded), which would generally lead to a higher ratio of pilot-channel power allocation to total power allocation (with relatively few traffic channels to which to allocate power). Instead or in addition, it could mean that RF conditions are favorable, such that no (or relatively few) mobile stations are experiencing a poor FFER. In that situation, there would be no (or relatively few) mobile stations inducing the base station to increase power on the traffic channels. This would tend to keep the value of $E_c/I_{or}$ relatively high. And other possibilities exist as well.

When $E_c/I_{or}$ is relatively low, this also could mean a number of things. For example, there could be a relatively high number of mobile stations on the sector/carrier (i.e. the sector/carrier is heavily loaded), and thus a high number of active traffic channels contributing to a high value of $I_{or}$, and thus a low value of $E_c/I_{or}$. Instead or in addition, it could mean that RF conditions are poor (e.g., due to terrain, weather, interference, etc.); in that case, mobile stations would likely experience poor FFER, and induce the base station to increase power on the traffic channels, which would contribute to a higher $I_{or}$ and thus a lower $E_c/I_{or}$. And other possibilities exist as well.

SUMMARY

Methods and systems are provided for dynamic adjustment of forward-link traffic-channel power levels based on forward-link RF conditions. In one aspect, an exemplary embodiment may take the form of a method. In accordance with the method, a base station provides service on a carrier in a wireless coverage area. The base station computes an $E_c/I_{or}$ value for the carrier. Based at least in part on the computed $E_c/I_{or}$ value, the base station adjusts at least one of an initial traffic-channel power level, a minimum traffic-channel power level, and a maximum traffic-channel power level for the carrier.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

In a typical CDMA base station, the amount of power that a given base station is using at a given moment to transmit forward-link data to a given mobile station on a traffic channel is affected by at least three parameters, known as the initial traffic-channel power (or initial traffic-channel gain), the minimum traffic-channel power (or minimum traffic-channel gain), and the maximum traffic-channel power (or maximum traffic-channel gain). In current base-station implementations, these three parameters are static values, set once for a given sector/carrier, ostensibly chosen for average conditions, including average loading conditions.

In base-station operation, when a mobile station engages in call setup on a sector/carrier or is handed off to that sector/carrier—i.e. when the mobile station begins operating on a traffic channel on the sector/carrier, the base station will initially transmit forward-link frames (which could include voice data, packet data, etc.) to the mobile station at a power level equal to the initial-traffic-channel-power setting. Thereafter, as described above, the mobile station will periodically calculate its FFER, set its $E_b/N_t$ threshold based on its FFER, and transmit PCBs equal to 0 or 1 based on a comparison of its computed $E_b/N_t$ with its $E_b/N_t$ threshold. Responsive to that stream of PCBs, the base station will iteratively increase or decrease the power dedicated to that mobile station's traffic channel accordingly.

This is where the minimum and maximum settings come into play. That is, the base station will not decrease the power dedicated to that traffic channel below the minimum-traffic-channel-power setting, nor will the base station increase the power dedicated to that traffic channel above the maximum-traffic-channel-power setting. The minimum is in place to ensure that sufficient power is used for an acceptable level of communication quality. And if the maximum is not enough to achieve an acceptable FFER, the base station and/or mobile station may terminate the communication session.

In accordance with the present invention, a base station, such as a CDMA base station, dynamically adjusts one, two, or preferably all three of the three above-mentioned forward-link transmission-power settings based on computed values of $E_c/I_{or}$ on the sector/carrier in question. As mentioned, $E_c/I_{or}$ is an indication of how lightly or heavily loaded the forward link is, with a relatively high $E_c/I_{or}$ generally corresponding to a lighter load of (i.e. fewer) mobile stations operating on the sector/carrier and a relatively low $E_c/I_{or}$ generally corresponding to a heavier load of (i.e. more)

mobile stations operating on the sector/carrier. And other metrics of sector/carrier load could be used instead of or in addition to $E_c/I_{or}$, such as gauging how many Walsh codes are in use on the sector/carrier, how occupied the paging-channel timeslots are, and/or any other suitable metric of forward-link load. $E_c/I_{or}$ is preferred however, due to the relationship between $E_c/I_{or}$ and forward-link transmission power.

Thus, in one embodiment, the base station may maintain two thresholds: an upper and a lower $E_c/I_{or}$ threshold. The base station periodically computes $E_c/I_{or}$ and compares the computed value with the stored thresholds. If $E_c/I_{or}$ is greater than the upper threshold, the base station increases the values of the initial, minimum, and maximum traffic-channel power settings. The high $E_c/I_{or}$ indicates that the base station is not heavily taxed with respect to forward-link power at that moment, and thus can give to mobile stations on the sector/carrier the benefits of higher call quality and greater coverage that come with using more forward-link power. Note that, in general, starting mobile stations off at a higher initial power, raising the lower-bound (minimum) power level, and raising the upper-bound (maximum) power level will, on average, result in mobile stations experiencing higher forward-link transmission-power levels.

If, however, the base station determines that $E_c/I_{or}$ is less than the lower threshold, the base station decreases the values of the initial, minimum, and maximum traffic-channel power settings. The low $E_c/I_{or}$ indicates that the base station is, at that time, heavily taxed with respect to forward-link power, and thus reduces the power settings, favoring capacity over call quality and coverage when power is scarce. In general, starting mobile stations off at a lower initial power, lowering the minimum power level, and lowering the maximum power level will, on average, result in mobile stations experiencing lower forward-link transmission-power levels.

In the third circumstance relevant to this example, the base station may determine that the $E_c/I_{or}$ is between the upper and lower thresholds. In that situation, the base station may decide to maintain the current levels of the initial, minimum, and maximum power levels.

With respect to how much to increase or decrease the power levels each time, one option would be to double them when increasing and halve them when decreasing. However, other multipliers could be used as well, such as increasing by a factor of 1.25 each time and decreasing by using a factor of 0.75 each time, just as examples. Furthermore, the base station could use particular increments and decrements of power, adding or subtracting a certain amount for each change. And other examples are possible as well. And certainly more than two thresholds (i.e. three ranges) of $E_c/I_{or}$ could be used as well. That is, there could be a table stored in the base station that correlates any number of ranges of $E_c/I_{or}$ with particular power settings, particular multipliers, particular increments and/or decrements, and/or any other type of value for use in transitioning from one power level to another.

Further in accordance with the present invention, a base station will preferably be configured to change the initial, minimum, and maximum traffic-channel power settings only so often, and to do so based on a number of $E_c/I_{or}$ values measured over a preceding time period, rather than based only on a most-recently-computed measurement of $E_c/I_{or}$. For example, the base station may determine whether to increase, decrease, or maintain the three power settings once every ten seconds, once every thirty seconds, once every minute, once every 10 minutes, or once per any other suitable time period. And the $E_c/I_{or}$ value that the base station uses to make that determination could be an average of multiple $E_c/I_{or}$ values computed over that time period. And other examples are possible as well. In general, this may prevent unnecessary consumption of resources and other problems that may occur from changing the power settings too frequently, particularly when $E_c/I_{or}$ is hovering near a given threshold.

Thus, the present invention allows a service provider to favor voice quality and coverage over capacity during periods of light traffic loading by increasing the initial, minimum, and maximum traffic-channel power settings. Note that increasing these three power settings should have the effect of increasing the average transmission power to mobile stations, and that increasing the initial-traffic-channel-power setting should also improve call setup and acceptance of handoffs, among other benefits. And the present invention also allows the service provider to favor capacity over voice quality and coverage during periods of heavy loading by reducing the initial, minimum, and maximum traffic-channel power settings.

2. Exemplary Architecture a. Exemplary Communication System

Figure 1:
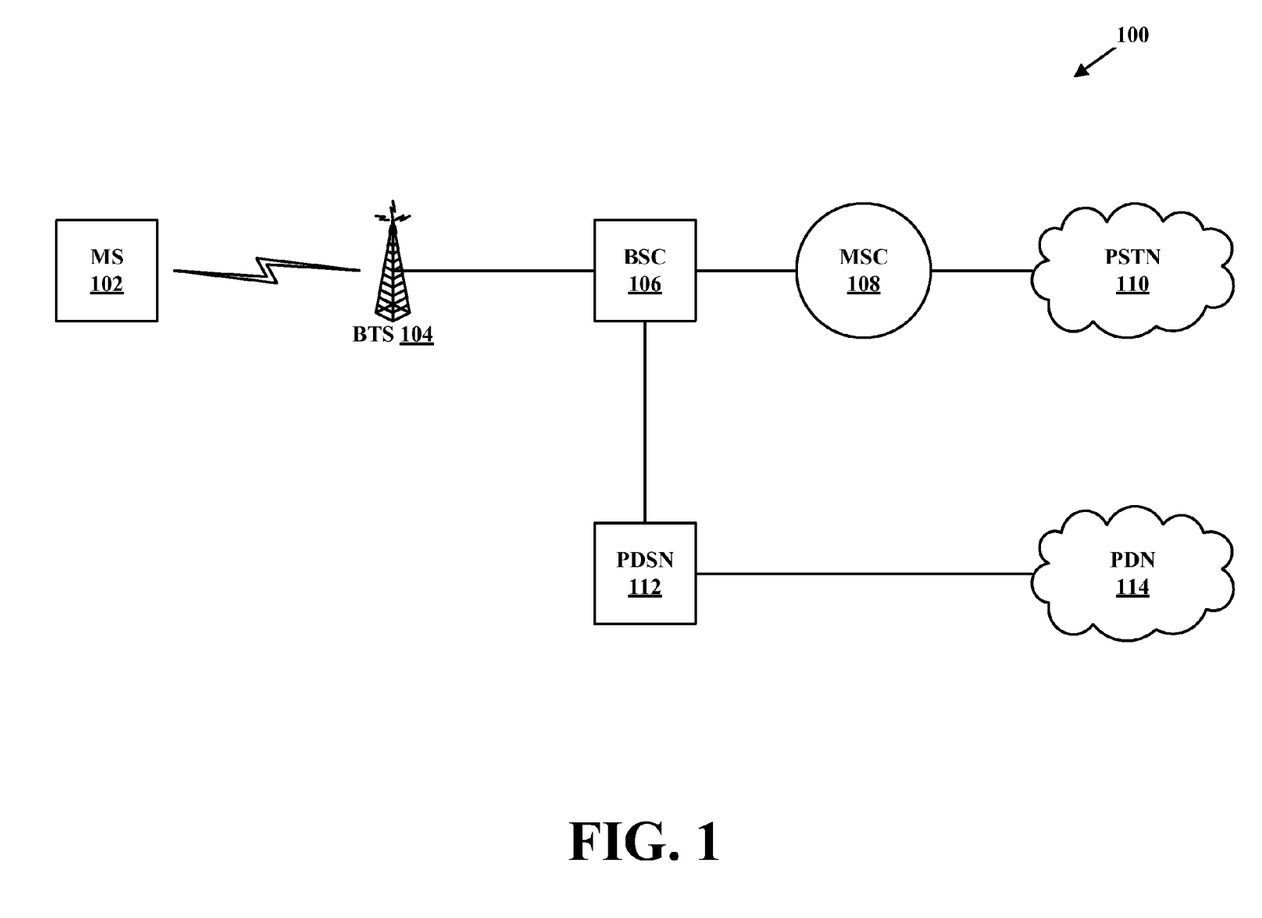
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a base transceiver station (BTS) 104, a base station controller (BSC) 106, a mobile switching center (MSC) 108, a public switched telephone network (PSTN) 110, a packet data serving node (PDSN) 112, and a packet-data network (PDN) 114. And additional entities could be present, such as additional mobile stations in communication with BTS 104, additional BTSs in communication with BSC 106, and additional BSCs in communication with MSC 108; furthermore, there could be additional entities in communication with PSTN 110 and/or PDN 114. Also, there could be one or more devices and/or networks making up at least part of one or more of the communication links. For example, there could be one or more routers, switches, or other devices or networks on the link between PDSN 112 and PDN 114. And PSTN 110 and PDN 114 may be connected via one or more gateways and/or other devices. And other variations and/or additions are possible as well.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as IS-856 Evolution Data Optimized (EV-DO) networks, Wi-Fi (IEEE 802.11) networks, Bluetooth devices, and/or one or more additional types of wireless networks. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Note that the combination of BTS 104 and BSC 106 may be considered—and referred to herein as—a base station. However, BTS 104 or BSC 106 could, taken alone, be considered a base station as well. Furthermore, a base station may be considered to be either or both of those devices, and perhaps make use of one or more functions provided by MSC 108, PDSN 112, and/or any other entity, without departing from the scope or spirit of the present invention.

BTS 104 may be any network element arranged to carry out the BTS functions described herein. As such, BTS 104 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile stations, such as mobile station 102, over an air interface. The communication interface may also include one or more wired and/or wireless interfaces for communicating with at least BSC 106. As an example, a wired Ethernet interface may be included. BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least BTS 104, MSC 108, and PDSN 112. In general, BSC 106 functions to control one or more BTSs such as BTS 104, and to provide one or more BTSs such as BTS 104 with connections to devices such as MSC 108 and PDSN 112.

MSC 108 may be any networking element arranged to carry out the MSC functions described herein. As such, MSC 108 may include a communication interface, a processor, and data storage comprising instructions executable by the processor to carry out those MSC functions. The communication interface may include one or more wired and/or wireless interfaces for communicating with at least BSC 106 and PSTN 110. In general, MSC 108 functions as a switching element between PSTN 110 and one or more BSCs such as BSC 106, facilitating communication between mobile stations and PSTN 110, which may be the well-known public switched telephone network.

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and PDN 114. In general, PDSN 112 functions as a network access server between PDN 114 and BSCs such as BSC 106, facilitating packet-data communication between mobile stations and PDN 114.

PDN 114 may include one or more wide area networks, one or more local area networks, one or more public networks such as the Internet, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

3. Exemplary Operation i. A First Exemplary Method

Figure 2:
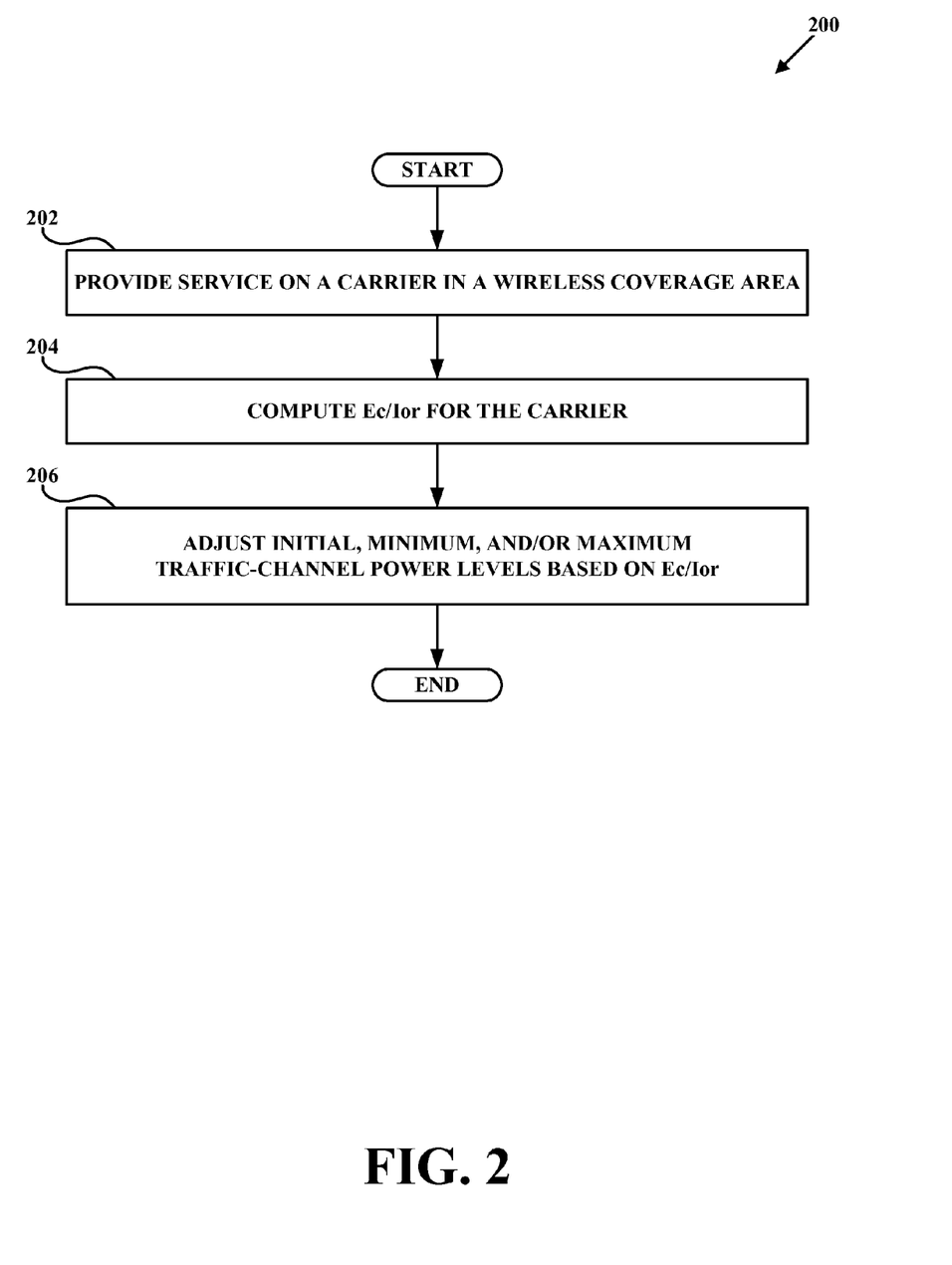
FIG. 2 is a flowchart of a first exemplary method, in accordance with exemplary embodiments.

FIG. 2 depicts a flowchart of a method, in accordance with exemplary embodiments. As shown in FIG. 2, method 200 begins at step 202, when BTS 104 provides service on a carrier in a wireless coverage area. At step 204, BTS 104 computes an $E_c/I_{or}$ value for the carrier. At step 206, BTS 104 adjusts the initial, minimum, and/or maximum traffic-channel power levels for the carrier based at least in part on the computed $E_c/I_{or}$ value. These steps are further explained in the following subsections.

Note that method 200 is described herein as being carried out by BTS 104. This, however, is not required. In general, method 200 can be carried out by any one or any combination of BTS 104, BSC 106, MSC 108, PDSN 110, a device known as a radio network controller, a device known as an access node, a computer, a server, and another network entity. Note as well that, as described herein, method 200 is preferably carried out on a periodic basis, such as once every 30 seconds, once every minute, or once per some other time interval, so as to dynamically adjust the initial, minimum, and/or maximum traffic-channel power levels for a given sector/carrier to changing forward-link RF conditions.

(1) Provide Service on a Carrier in a Wireless Coverage Area

At step 202, BTS 104 provides service on a carrier in a wireless coverage area. This service may be or include CDMA service, and the wireless coverage area could be or include a cell or a sector. For the balance of this description of FIG. 2, a sector will be used as an exemplary wireless coverage area. Furthermore, the description of step 202 as providing service on a carrier in the sector is in no way meant to exclude the possibility of providing service on more than one carrier in the sector. As above, the carrier to which step 202 refers may be referred to in this description of FIG. 2 as the sector/carrier.

(2) Compute $E_c/I_{or}$

At step 204, BTS 104 computes an $E_c/I_{or}$ value for the sector/carrier. As explained above, step 204 may involve computing the logarithmic ratio of two power levels. The first, referred to herein as the pilot-channel power level, is the power level at which BTS 104 is transmitting the pilot channel on the sector/carrier. The second, referred to herein as the all-channel power level, is the collective power level at which BTS 104 is transmitting the pilot channel, the paging channel, the sync channel, and any active traffic channels. In general, computation of $E_c/I_{or}$ by a CDMA (or other) base station is known in the art.

(3) Adjust Traffic-Channel Power Levels Based on $E_c/I_{or}$

At step 206, BTS 104 adjusts at least one of the initial, minimum, and maximum traffic-channel power levels for the carrier based at least in part on the computed $E_c/I_{or}$ value. As one example, step 206 may involve BTS 104 comparing the computed $E_c/I_{or}$ value with one or more threshold values. That is, BTS 104 may compare the computed $E_c/I_{or}$ with one or both of an upper forward-link RF threshold and a lower forward-link RF threshold. As examples, the upper threshold could be a value such as −4 dB, while the lower threshold could equal −7 dB, though other values could certainly be used as well.

Figure 4:
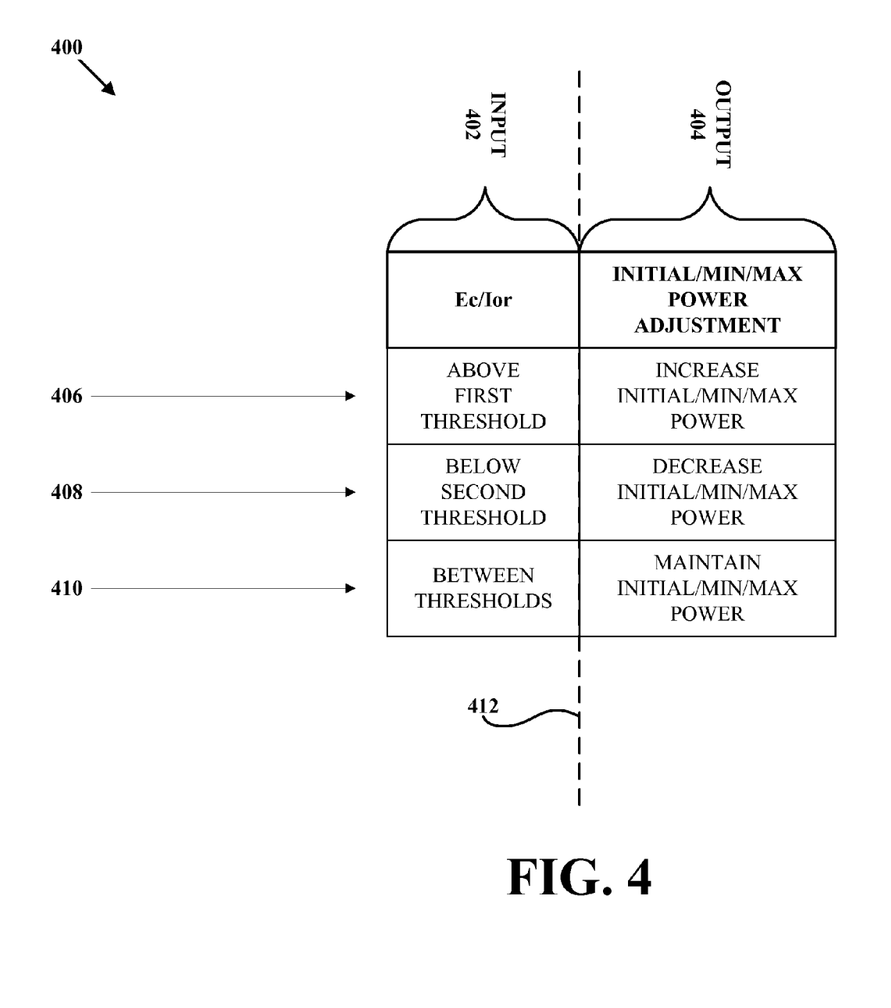
FIG. 4 is a table showing several exemplary situations, in accordance with exemplary embodiments.

If BTS 104 determines that the computed $E_c/I_{or}$ value is greater than the upper threshold, then BTS 104 may increase at least one of the initial, minimum, and maximum traffic-channel power levels, and preferably will increase all three. This situation is depicted as situation 406 in FIG. 4, which generally depicts three exemplary situations involving an upper and lower threshold for $E_c/I_{or}$. It can be seen from FIG. 4 that the column labeled "INPUT 402" (to the left of dashed line 412) provides comparisons of $E_c/I_{or}$ and the upper (first) and lower (second) threshold values for $E_c/I_{or}$. The column labeled "OUTPUT 404" (to the right of the dashed line 412) provides exemplary decisions as to how to adjust the three power levels.

If, on the other hand, BTS 104 determines that the computed $E_c/I_{or}$ value is less than the lower threshold (as depicted in situation 408 in FIG. 4), then BTS 104 may decrease at least one of the initial, minimum, and maximum traffic-channel power levels for the carrier in the coverage area, and, again, preferably will decrease all three. If BTS 104 determines that the computed $E_c/I_{or}$ value is between the upper and lower thresholds (situation 410), BTS 104 may decide to keep the initial, minimum, and maximum power levels at their current values.

Note that the $E_c/I_{or}$ value that BTS 104 uses for making the above-described comparisons and power-level-adjustment decisions could be the most-recently-taken measurement of $E_c/I_{or}$, though it could also be an average of $E_c/I_{or}$ values taken over some preceding time period. That is, BTS 104 may be arranged to adjust (or at least determine whether to adjust) these power levels once every 10 seconds, once every 30 seconds, or once per some other time interval; and the $E_c/I_{or}$ value used to make each determination could be the average of several $E_c/I_{or}$ values taken over that time period. This strategy would reduce the likelihood that BTS 104 would consume unnecessary resources by changing the power settings too often, which could occur if, for example, $E_c/I_{or}$ were hovering near a given threshold.

Furthermore, the use of two thresholds—and thus three ranges—of $E_c/I_{or}$ in this description is exemplary in nature. In general, any number of thresholds, including one, could be used to determine whether to increase, decrease, or maintain the values of the initial, minimum, and maximum traffic-channel power settings. In some embodiments, BTS 104 may include a table that correlates various ranges of $E_c/I_{or}$ with various multipliers, increments, decrements, or other transitional values for one or more of the power settings. Furthermore, such a table could include the values themselves that BTS 104 could put in place for the power settings. And other examples are possible as well, without departing from the scope or spirit of the present invention.

ii. A Second Exemplary Method

Figure 3:
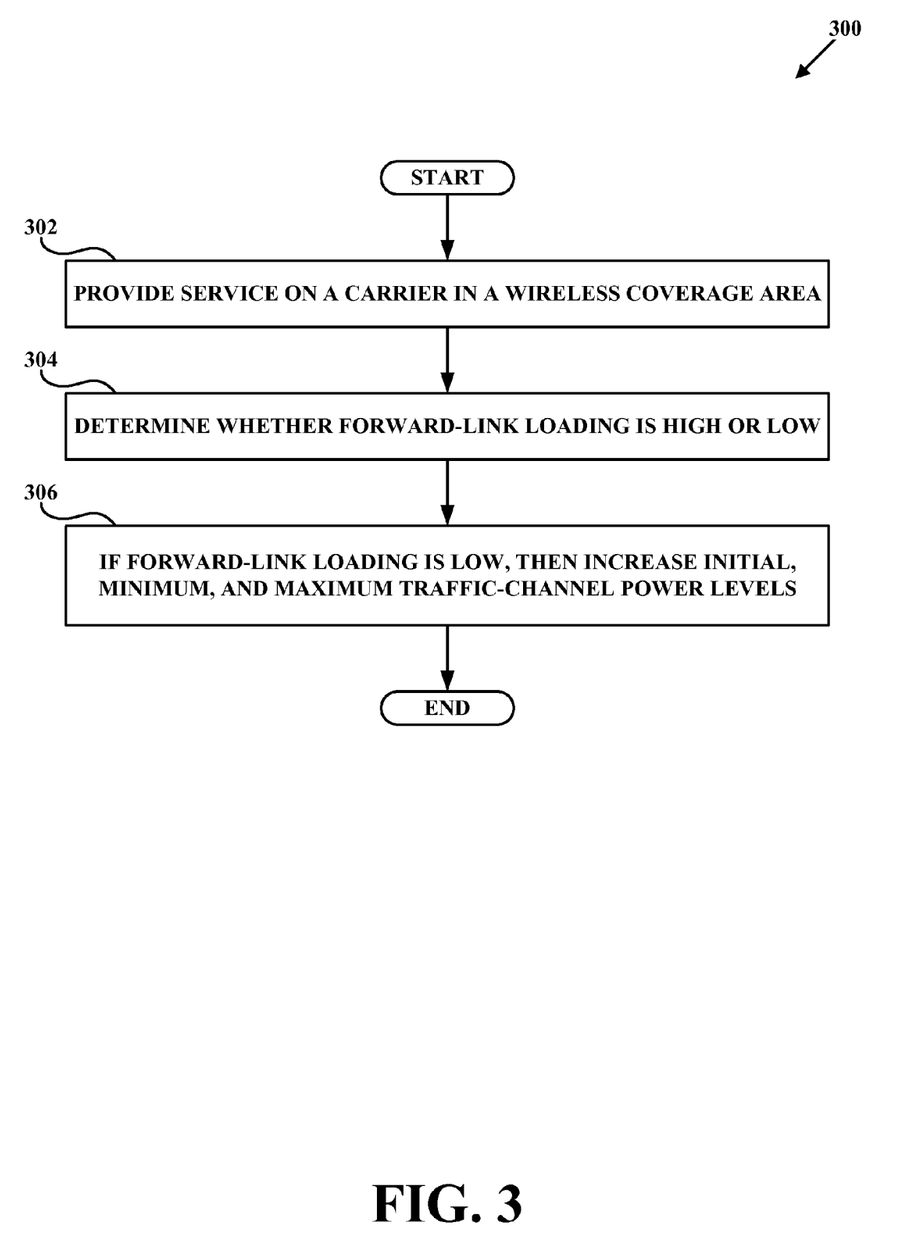
FIG. 3 is a flowchart of a second exemplary method, in accordance with exemplary embodiments.

FIG. 3 depicts a flowchart of a method, in accordance with exemplary embodiments. Note that method 300 of FIG. 3 is similar in some respects to method 200 of FIG. 2, and thus is not described in as great of detail. Like method 200, method 300 is described as being carried out by BTS 104, though method 300 could be carried out by any one or any combination of the entities described as possibilities for carrying out method 200, and/or any other entity or entities. And like method 200, it is preferable that method 300 be carried out periodically over time, so as to dynamically adjust the initial, minimum, and maximum traffic-channel power settings to varying loading levels on one or more sector/carriers.

As shown in FIG. 3, method 300 begins at step 302, when BTS 104 provides service on a carrier in a wireless coverage area. This service includes a forward link that initially has (i) the initial traffic-channel power level set to a first value, (ii) the minimum traffic-channel power level set to a second value, and (iii) the maximum traffic-channel power level set to a third value.

At step 304, BTS 104 determines whether a level of loading on the forward link is high or low. Note that, in step 304, loading generally refers to whether a relatively low number or a relatively high number of mobile stations are communicating on active traffic channels on the sector/carrier at the relevant time. As one example, step 304 may involve computing $E_c/I_{or}$ as described herein, where a high value of $E_c/I_{or}$ (i.e. relatively little power used for traffic-channel transmissions) would be associated with low loading, while a low value of $E_c/I_{or}$ (i.e. relatively high power used for traffic-channel transmissions) would be associated with high loading. Other loading metrics could be used as well, including examining how many traffic channels are assigned, paging-channel-timeslot usage, and/or any others.

At step 306, if the level of loading on the forward link is low, then BTS 104 sets (i) the initial traffic-channel power level to a fourth value, (ii) the minimum traffic-channel power level to a fifth value, and (iii) the maximum traffic-channel power level to a sixth value, where the fourth value is greater than the first value, the fifth value is greater than the second value, and the sixth value is greater than the third value. That is, BTS 104 increases all three values.

If, however, the level of loading on the forward link is high, then BTS 104 sets (i) the initial traffic-channel power level to a seventh value, (ii) the minimum traffic-channel power level to an eighth value, and (iii) the maximum traffic-channel power level to a ninth value, where the seventh value is less than the first value, the eighth value is less than the second value, and the ninth value is less than the third value. That is, BTS 104 decreases all three values.

4. Conclusion

Various exemplary embodiments have been described above. Those skilled in the art will understand, however, that changes and modifications may be made to those examples without departing from the scope of the claims.

What is claimed is:

1. A method comprising:

a base station providing service on a carrier in a wireless coverage area;

computing an $E_c/I_{or}$ value for the carrier, wherein the computed $E_c/I_{or}$ value comprises a logarithmic ratio of a pilot-channel power level to an all-channel power level, wherein the pilot-channel power level is the amount of power the base station is allocating for transmitting a pilot channel on a forward link of the carrier, and wherein the all-channel power level is the total amount of power the base station is allocating for transmitting all channels, including the pilot channel, on the forward link of the carrier; and adjusting an initial traffic-channel power level for the carrier based at least in part on the computed $E_c/I_{or}$ value, wherein the initial traffic-channel power level is a power level at which, on a coverage-area-wide basis, and for all traffic channels assigned by the base station on the carrier before any next such adjustment is made, the base station initially transmits on the forward link to mobile stations operating on the carrier, and wherein a plurality of traffic channels are assigned by the base station on the carrier before any next such adjustment is made.

2. The method of claim 1, wherein the base station comprises at least one of a base transceiver station, a base station controller, a radio network controller, and an access node.

3. The method of claim 1, wherein the service comprises code division multiple access (CDMA) service.

4. The method of claim 1, wherein the wireless coverage area comprises at least one of a cell and a sector.

5. The method of claim 1, wherein the forward link of the carrier comprises the pilot channel, a paging channel, and a sync channel.

6. The method of claim 5, wherein the forward link of the carrier further comprises one or more traffic channels.

7. The method of claim 1, wherein adjusting the initial traffic-channel power level for the carrier based at least in part on the computed $E_c/I_{or}$ value comprises comparing the computed $E_c/I_{or}$ value with at least one of an upper forward-link radio-frequency (RF) threshold and a lower forward-link RF threshold, wherein the upper forward-link RF threshold is greater than the lower forward-link RF threshold.

8. The method of claim 7, wherein the upper forward-link RF threshold is −4 dB, and wherein the lower forward-link RF threshold is −7 dB.

9. The method of claim 7, wherein adjusting the initial traffic-channel power level for the carrier based at least in part on the computed $E_c/I_{or}$ value further comprises:

if the computed $E_c/I_{or}$ value is greater than the upper forward-link RF threshold, then increasing the initial traffic-channel power level.

10. The method of claim 7, wherein adjusting the initial traffic-channel power level for the carrier based at least in part on the computed $E_c/I_{or}$ value further comprises:

if the computed $E_c/I_{or}$ value is less than the lower forward-link RF threshold, then decreasing the initial traffic-channel power level.

11. The method of claim 1, further comprising:

adjusting a minimum traffic-channel power level for the carrier based at least in part on the computed $E_c/I_{or}$ value.

12. The method of claim 1, further comprising:

adjusting a maximum traffic-channel power level for the carrier based at least in part on the computed $E_c/I_{or}$ value.

13. The method of claim 1, carried out on a periodic basis.

14. A base station comprising:

a wireless-communication interface;

a processor; and data storage containing instructions executable by the processor for:

providing service on a carrier in a wireless coverage area;

computing an $E_c/I_{or}$ value for the carrier, wherein the computed $E_c/I_{or}$ value comprises a logarithmic ratio of a pilot-channel power level to an all-channel power level, wherein the pilot-channel power level is the amount of power the base station is allocating for transmitting a pilot channel on a forward link of the carrier, and wherein the all-channel power level is the total amount of power the base station is allocating for transmitting all channels, including the pilot channel, on the forward link of the carrier; and adjusting an initial traffic-channel power level for the carrier based at least in part on the computed $E_c/I_{or}$ value, wherein the initial traffic-channel power level is a power level at which, on a coverage-area-wide basis, and for all traffic channels assigned by the base station on the carrier before any next such adjustment is made, the base station initially transmits on the forward link to mobile stations operating on the carrier, and wherein a plurality of traffic channels are assigned before any next such adjustment is made.

15. The base station of claim 14, wherein adjusting the initial traffic-channel power level for the carrier based at least in part on the computed $E_c/I_{or}$ value comprises comparing the computed $E_c/I_{or}$ value with at least one of an upper forward-link radio-frequency (RF) threshold and a lower forward-link RF threshold, wherein the upper forward-link RF threshold is greater than the lower forward-link RF threshold;

if the computed $E_c/I_{or}$ value is greater than the upper forward-link RF threshold, then increasing the initial traffic-channel power level; and if the computed $E_c/I_{or}$ value is less than the lower forward-link RF threshold, then decreasing the initial traffic-channel power level.

* * * * *